April 15, 1941.　　　K. J. MOSEBACH　　　2,238,779
METHOD OF MAKING NETS
Filed July 2, 1940

INVENTOR
Karl J. Mosebach
By Archworth Martin
His Attorney

Patented Apr. 15, 1941

2,238,779

UNITED STATES PATENT OFFICE 2,238,779

METHOD OF MAKING NETS

Karl J. Mosebach, Pittsburgh, Pa.

Application July 2, 1940, Serial No. 343,613

3 Claims. (Cl. 140—112)

My invention relates to nets and more particularly to nets which comprise wire cables or ropes, suitable for use in the sweeping of mine-infested waters, as defense against submarine boats, torpedoes, etc.

Some of the objects of my invention are to provide a net of simplified form and great strength, and which can quickly and conveniently be made.

Figure 1:
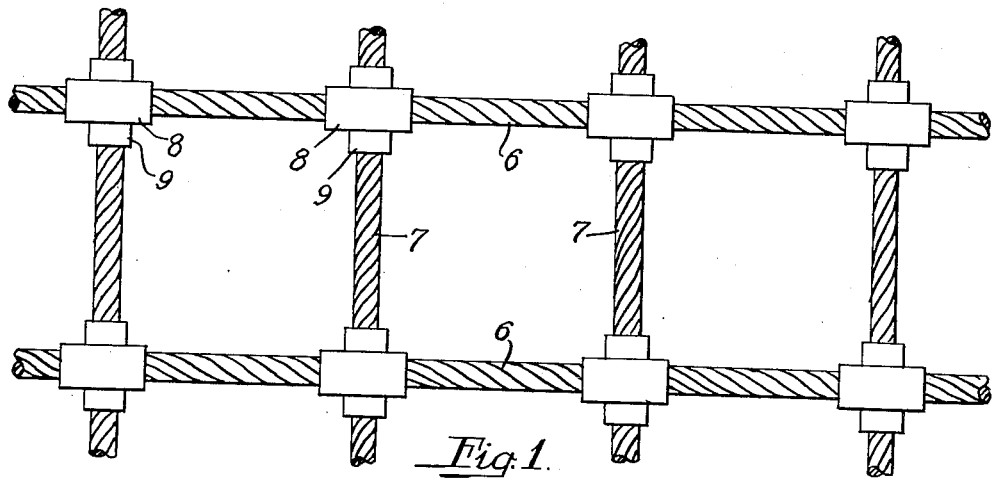
Figure 2:
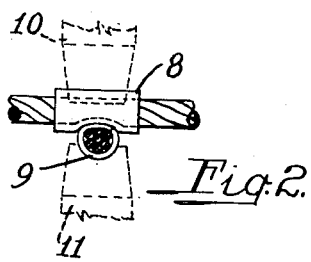
Figure 3:
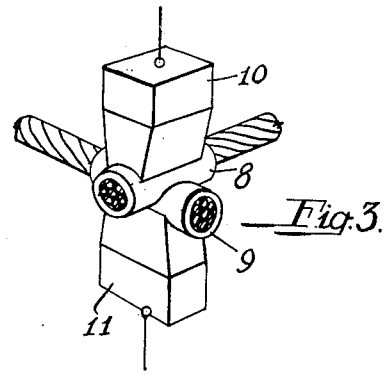
Figure 4:
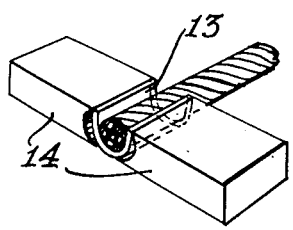

Some of the forms which my invention may take are shown in the accompanying drawing wherein Figure 1 is a plan view of a portion of the net; Fig. 2 is a view schematically showing the manner in which the cables of the net are welded together where they cross one another; Fig. 3 is a perspective view showing in more detail the operation of making welded connections between the cables at their crossings; Fig. 4 shows a manner in which the connecting and strengthening sleeves may be placed upon the cables preliminary to making the welded connections, and Fig. 5 shows the manner in which the split sleeves placed upon the cables as in Fig. 4 are secured together.

In forming a net, a desired number of high-strength longitudinally-extending wire ropes or cables 6 and transverse cables 7 are provided, depending upon the length and width of the net to be made. Short metal sleeves 8 and 9 are slid into place upon the cables 6 and 7 respectively. The internal diameters of these sleeves will be the same as or but slightly greater than the external diameters of the cables. The sleeves may conveniently be in the form of short lengths cut from wrought iron pipe, or can be of any other suitable metal or alloy having the strength required to grip the cables, after said sleeves have been compressed or swaged thereon, so that the cables cannot slip in the sleeve under tension. The sleeves may conveniently have a length of approximately four inches and the cables may be of one inch diameter or greater or less diameter, depending upon the strength desired. Also, the cables 6—6 can be spaced apart a distance of approximately 12 inches, for example, and likewise the cables 7—7, depending upon the use to which the cable is to be put and the size of mesh opening desired.

When the sleeves 8 and 9 each have been strung upon their respective cables 6 and 7, they are brought into desired longitudinally-spaced relation and very tightly compressed onto the cables so as to compress the strands into compact engagement with one another and to form sufficiently close frictional engagement with the cables that the strength of the net at the joints will equal or exceed the strength of the cables at points between the joints. The sleeves are then placed in crossed relation where the cables cross one another, whereupon a pair of electrodes 10 and 11, connected to a suitable source of welding current, are brought into position against the sleeves, as shown in Figs. 2 and 3. Welding current is caused to flow through the electrodes and the sleeves, and as the metal of the sleeves becomes softened, pressure will be applied to the electrodes to squeeze the sleeves together, thereby not only providing the necessary welding pressure, but also causing slight indentations in the opposed contacting surfaces of the sleeves, which results in compressing the cable strands somewhat and thereby increasing the binding engagement between the sleeves and the cables. The greatest resistance to the flow of current will be at the exact points where the sleeves cross one another, so that the heating of the sleeves will be largely localized and the cable strands will not be seriously affected by the heat. Also, it will be noted that the sleeve-contacting areas of electrodes 10 and 11 may be curved to fit the outer sides of the sleeves, thereby not only overcoming any tendency of the sleeves to become distorted on their outer sides during the welding operation, but also assisting in maintaining them in proper relative positions during the welding operation.

Figure 5:
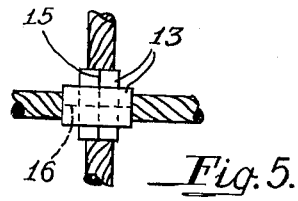

Referring now to Figs. 4 and 5, I show a manner in which the connecting sleeves may be placed upon the cables otherwise than by slipping them endwise of the cables. In this arrangement, strips of metal are cut into short lengths and bent to partially circular form, as indicated by the sleeve member 13 in Fig. 4. These members 13 are placed between presser dies 14, each having a semi-circular recess. The cables are placed in these split sleeves 13, whereupon the dies 14 are forced together to close the sleeve tightly around the cable. When the sleeves have been thus assembled upon the cables, they are brought into crossed relation, with the split or line of division 15 of a lower sleeve having direct engagement with the split line 16 of an upper sleeve. The sleeves are then placed between welding electrodes as in Fig. 3. The welding current will not only cause the sleeves to be united, but will fuse together the abutting edges of each sleeve, at least for a short distance longitudinally of the sleeve.

If the sleeves have been compressed tightly enough upon the cables by the presser dies 14, the welding deformation need not be carried quite so far as indicated in Fig. 2, in order to hold the cables against slipping in the sleeves. The sleeves 13 ordinarily will not be made of as great length as would be feasible with sleeves which are not of split form, because if they are too long, and the edges not welded together throughout their lengths, there would be danger of their ends being spread through flexing of the cables. In many instances it will be sufficient if these sleeves 13 are of only three inches in length. The wall thickness of the tubes may be of a dimension common in water pipes or gas pipes of corresponding diameters.

Owing to the rigidity of the tubes and their short lengths relative to the width of mesh opening, the cable can conveniently be rolled for stowing and with little danger of deformation or entanglement. The compression or flattening of the tubes under welding pressure can conveniently be for a distance of one-fourth to one-third of the tube diameter. In either case, an extended welding area is provided and the unflattened portions of each will lie against and serve as bracing shoulders for the sides of its companion tube, thus producing a joint of very great strength.

I claim as my invention:

1. The method of making nets, which comprises placing metallic sleeves upon cables, arranging the cables in crossed relation, with a pair of the sleeves in crossed relation at each cable crossing, and electrically welding each pair of sleeves together without heating the cables to softening temperature, while applying pressure thereto in directions perpendicular to the plane of the mesh, with pressure sufficient to deform the sleeves and slightly flatten the cables at points within the sleeves.

2. The method of making nets, which comprises bending short metal plates around cables to form sleeves thereon, placing the sleeves of longitudinally-extending cables in crossed relation with the sleeves of transverse cables, with the split lines of each pair of sleeves in contact with one another, and welding the sleeves together by electrical current and pressure.

3. The method of making nets, which comprises bending short metal plates around cables to form sleeves thereon, placing the sleeves of longitudinally-extending cables in crossed relation with the sleeves of transverse cables, with the split lines of each pair of sleeves in contact with one another, welding the sleeves together by electrodes placed against the remote sides thereof, and simultaneously pressing the sleeves toward one another.

KARL J. MOSEBACH.